United States Patent [19]

Mizutani et al.

[11] Patent Number: 4,600,513

[45] Date of Patent: Jul. 15, 1986

[54] COMPOSITION FOR THE CLARIFICATION AND DETACKIFICATION OF PAINT SPRAY BOOTH WASTES

[75] Inventors: Akihiko Mizutani, Ohita; Hiroyoshi Murayama, Tokyo; Kohsaku Arakawa; Saburo Tanaka, both of Mie, all of Japan

[73] Assignee: Hakuto Chemical Co., Ltd., Tokyo, Japan

[21] Appl. No.: 647,823

[22] Filed: Sep. 5, 1984

[51] Int. Cl.[4] ............................................. C02F 1/56
[52] U.S. Cl. ...................................... 210/712; 55/84; 55/89; 134/13; 134/38; 210/725; 210/728; 210/735; 252/181; 427/331; 427/345; 427/421
[58] Field of Search ................. 55/84, 89; 134/13, 38; 210/712, 723, 725, 728, 735; 252/181; 427/331, 345, 421

[56] References Cited

U.S. PATENT DOCUMENTS

| | | | |
|---|---|---|---|
| 3,251,882 | 5/1966 | Kirkpatrick et al. | 564/482 |
| 3,372,129 | 3/1968 | Phillips | 528/397 |
| 3,468,818 | 9/1969 | Phillips' | 528/27 |
| 3,751,474 | 8/1973 | Phillips et al. | 564/482 |
| 3,861,887 | 1/1975 | Forney | 55/19 |
| 3,990,869 | 11/1976 | Forney | 55/19 |
| 3,990,986 | 11/1976 | Gabel et al. | 252/315 |
| 4,002,490 | 1/1977 | Michalski et al. | 134/38 |
| 4,055,495 | 10/1977 | Gabel et al. | 210/52 |
| 4,130,674 | 12/1978 | Roberts et al. | 252/181 |
| 4,440,647 | 3/1984 | Puchalski | 210/712 |

FOREIGN PATENT DOCUMENTS 127606 7/1984 Japan .
57962 11/1974 Romania .

OTHER PUBLICATIONS

Sinev et al., "Electrolysis of Sodium Zincate Solutions from Zinc-Containing Waste Water Sludge", Khim. Tekhnol. (Kiev) 1975, (4), 55–7.

*Primary Examiner*—Paul Lieberman
*Assistant Examiner*—Robert A. Wax
*Attorney, Agent, or Firm*—Wenderoth, Lind & Ponack

[57] ABSTRACT

Chemical treatments for detackification and separation of over-sprayed paints and lacquers in spray booths without corrosion and pollution problems. Water used to wash the air in paint or lacquer spray booths in order to remove over-sprayed paint or lacquers is treated with alkali-metal zincates optionally further containing strong cationic polyamine to reduce the tackiness of paint and lacquer solids and thereby reduce the tendency of oversprayed paints and lacquers to adhere to walls, ceilings and floors of said spray booths and also to condition the paint and lacquer solids removed with the water so that they can be separated and the water recycled for further use in washing the air in the spray booth. Furthermore, very little corrosion of air ducts, walls and ceilings of said spray booths, due to concentrated salts from the added chemicals, is expected because both alkali metal zincates and cationic polyamines contain only trace amounts of chlorides and sulfates.

6 Claims, 1 Drawing Figure

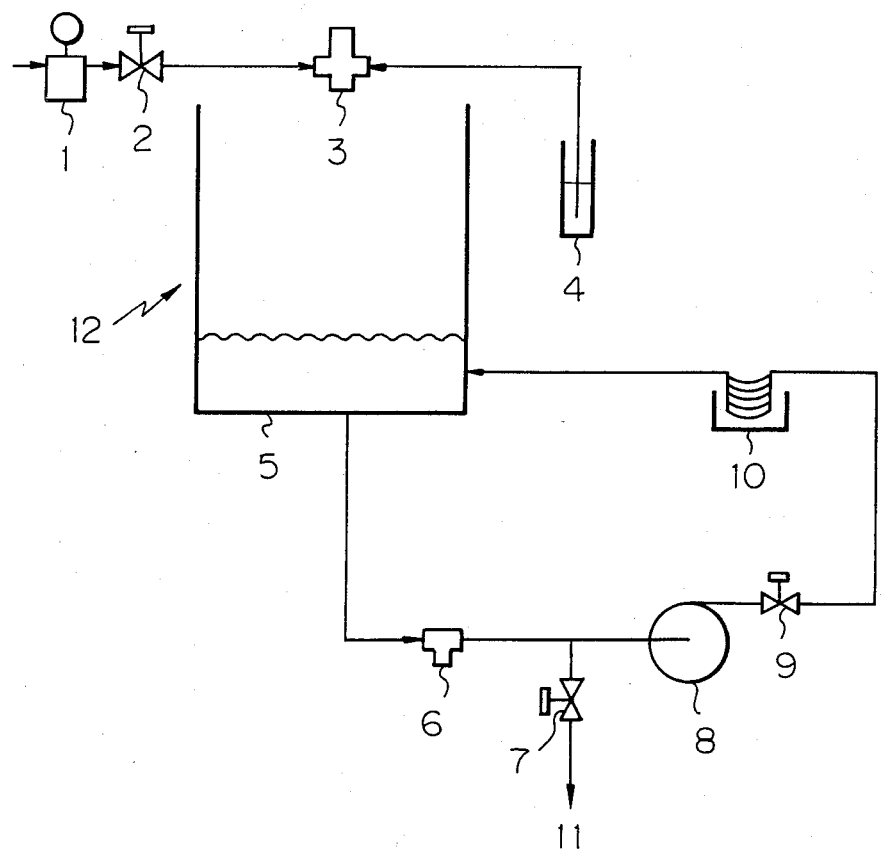

COMPOSITION FOR THE CLARIFICATION AND DETACKIFICATION OF PAINT SPRAY BOOTH WASTES

BACKGROUND OF THE INVENTION

1. Field of the Invention

This invention relates to treatment chemicals for recirculating water of a spray booth which enable the reuse of treated water by separating paint scum from scrubbing water contaminated with excess paint dusts in the painting system of automobiles, household electric appliances, etc.

2. Description of Prior Art

To separate excess paint scum from scrubbing water, various inorganic coagulants with or without an organic high molecular weight polymer have been used to coagulate and flocculate them to larger flocs which easily settle or float, and the thus treated water is reused as the recirculating water of the paint booth. Acidic coagulants such as alum, aluminum chloride, polyaluminum chloride, ferric chloride, zinc chloride, zinc sulfate, etc. have been used as inorganic coagulants; however, the pH of booth water thus becomes acidic necessitating the use of caustic soda to adjust the pH in the optimum range for floc formations. The thus formed chloride ion or sulfate ion remains and concentrates in the recirculating water when the system is closed tightly and the water mist entrained into and adhered to the booth air duct may cause severe corrosion, which sometimes breaks air ducts and causes the plant to be closed.

The separated scum also contains chloride or sulfate which release hydrogen chloride or sulfur dioxide in the incinerator resulting not only in severe air pollution but also in short life of the incinerator. A large investment is necessary in order to install equipment for preventing air pollution caused by such harmful gases.

SUMMARY OF THE INVENTION

It is an object of the invention to provide treatment chemicals for the recirculating water of wet paint spray booths so that excess paint dusts are coagulated and can easily settle or float, and to mimimize or eliminate corrosion of spray booth structures and air pollution due to the incineration of concentrated salts from added chemicals.

It is another object of the invention to provide safe and reliable treatment chemicals for the recirculating water of wet paint spray booths.

Other objects and advantages of the present invention will become apparent to those skilled in the art from the following description and figure.

BRIEF DESCRIPTION OF THE DRAWING

The attached FIGURE shows the flow diagram of the test paint spray booth system used for the evaluation of treatment chemicals of this invention.

DESCRIPTION OF THE PREFERRED EMBODIMENTS

This invention relates to treatment chemicals for recirculating water of a spray booth in which alkali zincate added to the paint water forms finely divided $Zn(OH)_2$ or related complexes by hydrolysis as the pH of water comes down from 11 to 8 and the thus formed $Zn(OH)_2$ or related complexes coagulate excess paint dusts so that they easily settle or float. The $Zn(OH)_2$ or related complexes according to this invention are smaller in size than those formed as the pH of water comes up from 4 to 8 thereby obtaining greater contact area with the paint dusts and requiring smaller amounts of zincates added thereto. Thus, there is no fear of corrosion of spray booth structures and air pollution due to the incineration of concentrated salts (chlorides, sulfates, etc.) from added chemicals.

In other words, when alkali metal zincates dissolved in alkali metal hydroxide solution alone or with the further addition thereto of a strong cationic polyamine having an average molecular weight of 500–100,000, an amino or quaternized amine group, as a cationic group and a hydrocarbon chain, is added to paint waste water, the pH of the water goes down gradually by absorbing $CO_2$ from the air or being neutralized by organic acids formed by the degradation of organic materials in the paint by aerobic bacteria, and $Zn(OH)_2$ or a related complex is formed in the course of water recirculation.

Since the coagulant in this invention does not form chloride or sulfate, which is formed by the pH adjustment of traditional coagulants, pollution problems due to harmful corrosive gases, the corrosion of booth ducts and ill effects upon paint scum incinerators are all solved by the use of this invention.

Another benefit of this invention to be emphasized is that the blow down water from recirculating water can be treated with activated sludge without problem because it contains a much smaller amount of chlorides or sulfates.

Paint which can be treated by this invention includes oily and water soluble paints of epoxy, melamine, acryl, alkyd, polyester, polyurethane and similar types.

Paint spray booths which can be treated by this invention include wet types such as water curtain, venturi, non-pump, etc.

When applying the chemicals of this invention, about 0.1–50 weight parts of alkali metal zincate are added to 100 parts of excess paint. A dosage less than this range results in poor performance and one higher than this range is not recommended due to an overly high resultant pH. Chemicals should be fed to a point where good mixing can take place such as the fall crest out of the recirculating pump.

The joint use of cationic polyamine type polymer enhances the detackification of excess paint effectively preventing the adhesion of paint to the wall, ceiling, floor and duct of a booth. The addition of alkali metal zincate at the above dosage seems to raise the pH of water very high; however, the pH drops much faster than expected by absorbing $CO_2$ from the air during recirculation. When the pH drops, zinc hydroxide is formed, adheres to paint dusts and detackifies them. The paint scums which float up or settle are removed from the booth system.

Alkali metal zincates dissolved in alkali metal hydroxide water solution (alkali metals include Na, K, Li) are expressed by general formulas $M[Zn(OH)_3]$, $M_2[Zn(OH)_4]$ and their complexes in MOH solution (M=Li, Na, K), although not limited to these, and include Zn compounds which form $Zn(OH)_2$ or related complexes by hydrolysis when the pH goes from 11 down to 8.

Strong cationic polyamines having synergistic effects with alkali metal zincates in alkali metal hydroxide water solution consist of amino or an quaternized amine group as cationic groups, and a hydrocarbon chain, and have a molecular weight of 500–100,000. They include, for example, polycondensates of polyethylene glycol/-hexamethylene-diamine, ethylene-diamine/ethylene-dichloride and ammonia/ethylene-dichloride, etc. Also included are polyethylene polyamine; polycondensates having a molecular weight of at least 1000 of epichlorohydrin and precondensates of polyalkylene polyamines and polyoxyalkylene gylcol chlorides; and condensation products of hexamethylene diamine, polyethylene glycol, epichlorohydrin and 1,4-dichloro-2-butene. An average molecular weight of less than 500 results in poor coagulation and one not exceeding 100,000 is recommended for this invention; however, even if the molecular weight exceeds 100,000, they are still effective in spite of some operational difficulties inherent in a very high molecular weight polymer. 0.2–5 weight parts of a strong cationic polymer is preferably added to 1 weight part of Zn ions dissolved in alkali metal hydroxide water solution. A dosage outside this range results in poor performance and is not recommended. The use of the above strong cationic polymers is referred to in U.S. Pat. Nos. 3,251,882, 3,751,474, 3,372,129 and 3,468,818.

Traditional alkaline coagulants such as sodium aluminates and calcium hydroxide can be used with the chemicals of this invention.

The invention will be illustrated but is not limited by the following examples in which the quantities are given in parts by weight unless otherwise indicated.

EXAMPLE I

Sodium zincate/NaOH water solution containing 7.1% by weight of Zn and 30% by weight of NaOH is first dissolved into the holding water of the test spray booth 12 shown in the attached FIGURE (holding water capacity 100 L, recirculating water rate 10 L min.) to the extent of 0.05% (50 g). Then 0.35 kg/min. of automobile finishing paint consisting of a mixture of melamine alkyd type resin as a solid color and melamine acryl type resin as a metallic color (1:1) and 0.07 kg/min. of the above Na-zincate/NaOH solution are continuously fed into the water in the recirculating water tank 5 by a spray gun 3 and through a metering pump (not shown) respectively. Into said spray gun 3, the paint is fed from paint reservoir 4 and compressed air is fed through air regulator 1 and needle valve 2. A part of the water from the recirculating water tank 5 is taken out and the paint scum is removed by means of in-line filter 6. The flow rate of the recirculating water is adjusted to 10 l/min. through a centrifugal pump 8 and a gate valve 9. The water is subsequently returned to the recirculating water tank 5 via a condenser and water bath 10 in which the temperature of the water is adjusted to about 20° C. The treated water after removal of the paint scum is collected for sampling by drain and sample collector 11 through ball valve 7. The test booth was operated for an hour. The paint was sufficiently detackified and floated up with 75% recovery ratio. The treated water without paint scum showed good qualities such as pH 9.8–10.0, electric conductivity 460 micro mko/cm, COD 100 ppm and transparency 30 cm.

EXAMPLE II

The joint use of a strong cationic polyamine with Na-zincate/NaOH water solution in Example I at the ratio of 39 weight parts of the polyamine to 100 weight parts of Zn ion in the water proved to give a paint sludge even easier to treat than Example I. A polycondensate of polyethylene glycol and hexamethylenediamine having an average molecular weight of about 3000 was used as a strong cationic polymer. The paint recovery ratio was 90%. Qualities of treated water were pH 9.6–10, electric conductivity 560 micro mko/cm, COD 130 ppm and transparency 30 cm. The use of a cationic polyamine not only improved the paint recovery ratio but also detackified the paint scums much better. Furthermore, long term recirculation of booth water without a cationic polyamine tends to cause malodor due to putrefaction caused by bacteria even with some blow down; however, a strong cationic polyamine can prevent such odor.

The results of Example I and II are summarized in the following Table. As for factors difficult to quantify such as detackification, the performances were expressed by 4 stages ⊚, O, Δ and X in the order of better performances. Mild steel (SS-41) plates and commercial galvanized steel plates were used for corrosion tests. Test pieces were immersed in 40 ml test solution (industrial water containing 0.4% Na-zincate/NaOH solution alone or with 110 ppm cationic polymer) in a Petri dish, dried in a ventilating oven at 50° C., and immersed repeatedly in 40 ml test solution. The weight loss by corrosion was determined after 4 days in order to simulate corrosive conditions of booth duct walls drying dissolved salts contained in the entrained mist of treated recirculating water.

TABLE

|  | Example I | Example II | Traditional Detackifier* |
|---|---|---|---|
| Detackification of paint scum | o | ⊚ | ⊚ |
| Recovery of paint scum | o 80% | ⊚ 90% | ⊚ 90% |
| Floating of paint scum | ⊚ | ⊚ | ⊚ |
| Ease of waste water treatment | ⊚ | ⊚ | ⊚ |
| Less foaming | ⊚ | o | o |
| Less malodor | ⊚ | ⊚ | ⊚ |
| Less pollution by incineration of scum | ⊚ | ⊚ | X |
| Corrosion rate: |  |  |  |
| mild steel | ⊚ 0.4 MDD** | ⊚ 0.4 MDD | X 24.2 MDD |
| galvanized steel | ⊚ 0.7 MDD | ⊚ 0.7 MDD | X 4.1 MDD |
| Total evaluation | ⊚ | ⊚ | X |

*The blend disclosed in Example of U.S. Pat. No. 3,861,887 was used. The air duct used broke within one year due to high chloride concentration in circulating water.
**MDD: mg/dm$^2$/day
As seen from the above results of Examples I and II, this invention achieved expected targets sufficiently and is belived to contribute greatly to industrial use.

What is claimed is:

1. A process for controlling contamination in a wet paint spray booth in which water is used to wash air in said booth, and to remove over-sprayed paints, said water being recirculated for further use in washing the air in said spray booth, said process comprising:
   adding to said water an effective amount of a detackifying treatment composition comprising an alkali metal zincate, substantially free of chloride ions and sulfate ions, dissolved in an aqueous alkali metal hydroxide solution at pH 8–11, said alkali metal being sodium, potassium or lithium, and said composition being effective to condition paint solids so as to facilitate removal of said solids from said water, and
   gradually lowering the pH of said water by absorbing $CO_2$ from air or neutralization by organic acids formed by degradation of organic materials in said paint by aerobic bacteria.

2. A process of claim 1, wherein the content of the alkali metal zincate is about 0.1–50 weight parts to 100 weight parts of over-sprayed paints.

3. A process of claim 1, wherein the composition further contains a cationic polyamine having an amino or quarternized amine group as a cationic group and a hydrocarbon chain, and an average molecular weight of 500–100,000, selected from the group consisting of polycondensates of polyethylene glycol and hexamethylene-diamine; polycondensates of ethylene-diamine and ethylene-dichloride; polycondensates of ammonia and ethylene-dichloride; polyethylene polyamine; polycondensates having a molecular weight of at least 1000 of epichlorohydrin and precondensates of polyalkylene polyamines and polyoxyalkylene glycol chlorides; and condensation products of hexamethylene diamine, polyethylene glycol, epichlorohydrin and 1,4-dichloro-2-butene.

4. A process of claim 3, wherein the content of the cationic polyamine is about 0.2–5 weight parts to 1 weight part of zinc ions dissolved in the aqueous alkali metal hydroxide solution.

5. A process of claim 2, wherein the composition further contains a cationic polyamine having an amino or quaternized amine group as a cationic group and a hydrocarbon chain, and an average molecular weight of 500–100,000, selected from the group consisting of polycondensates of polyethylene glycol and hexamethylene-diamine; polycondensates of ethylene-diamine and ethylene-dichloride; polycondensates of ammonia and ethylene-dichloride; polyethylene polyamine; polycondensates having a molecular weight of at least 1000 of epichlorohydrin and precondensates of polyalkylene polyamines and polyoxyalkylene glycol chlorides; and condensation products of hexamethylene diamine, polyethylene glycol, epichlorohydrin and 1,4-dichloro-2-butene.

6. A process of claim 5, wherein the content of the cationic polyamine is about 0.2–5 weight parts to 1 weight part of zinc ions dissolved in the aqueous alkali metal hydroxide solution.

* * * * *

UNITED STATES PATENT AND TRADEMARK OFFICE
CERTIFICATE OF CORRECTION

PATENT NO. : 4,600,513

DATED : July 15, 1986

INVENTOR(S) : Akihiko MIZUTANI, Hiroyoshi MURAYAMA, Kohsaku ARAKAWA and Saburo TANAKA It is certified that error appears in the above-identified patent and that said Letters Patent is hereby corrected as shown below:

Column 2, line 66, change "amino or an" to --an amino or--;

Column 3, line 60, change "mko/cm" to --mho/cm--;

Column 4, line 5, change "mko/cm" to --mho/cm--;

in the Table, in the last column on the right, delete "X" at line 41 of column 4, and change the double circle at line 42 to --X--.

Signed and Sealed this

Eighth Day of March, 1988

Attest:

DONALD J. QUIGG

Attesting Officer

Commissioner of Patents and Trademarks